A. BRUNNERT.
FARM IMPLEMENT.
APPLICATION FILED MAY 31, 1921.

1,388,847.

Patented Aug. 30, 1921.

2 SHEETS—SHEET 1.

Inventor:
Anton Brunnert.
By Harry A. Benna
Attorney.

A. BRUNNERT.
FARM IMPLEMENT.
APPLICATION FILED MAY 31, 1921.
1,388,847.
Patented Aug. 30, 1921.
2 SHEETS—SHEET 2.
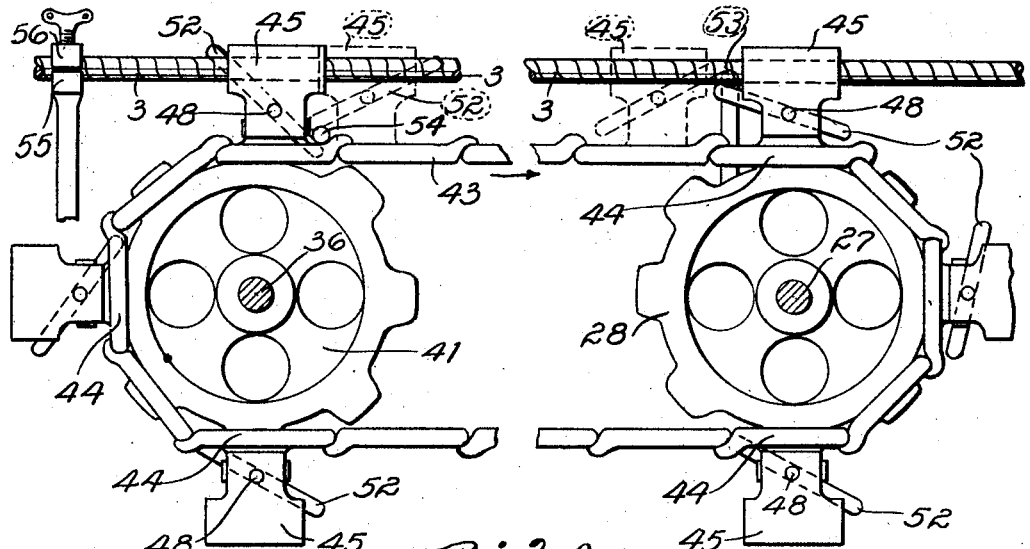
Fig. 4.
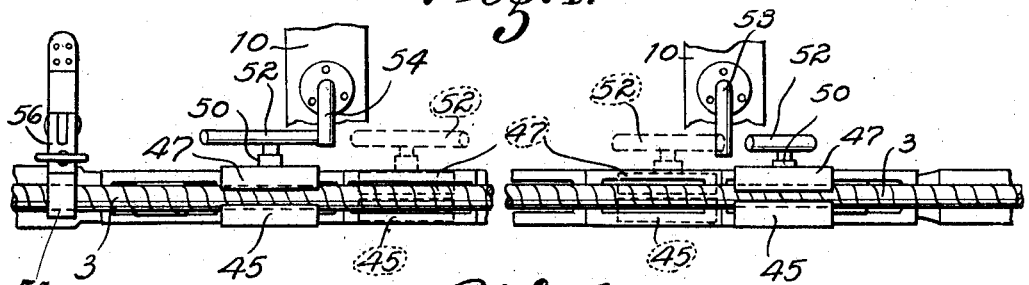
Fig. 5.
Fig. 6.
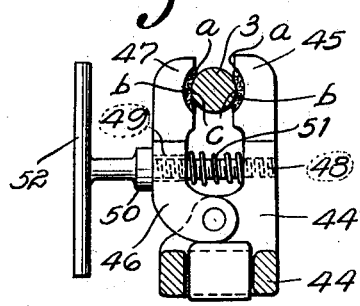
Fig. 7.
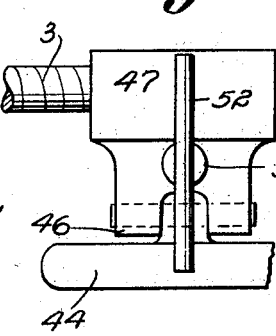
Fig. 8.
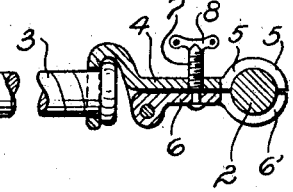
Inventor:
Anton Brunnert
By Harry A. Beine
Attorney

UNITED STATES PATENT OFFICE.

ANTON BRUNNERT, OF OLD MONROE, MISSOURI.

FARM IMPLEMENT.

1,388,847. Specification of Letters Patent. Patented Aug. 30, 1921.

Application filed May 31, 1921. Serial No. 473,658.

*To all whom it may concern:*

Be it known that I, ANTON BRUNNERT, a citizen of the United States, residing at Old Monroe, in the county of Lincoln and State of Missouri, have invented certain new and useful Improvements in Farm Implements, of which the following is a specification.

My invention has relation to improvements in farm implements and is particularly directed to tractor devices for pulling plows, harrows, etc. over the soil.

It is generally understood that a tractor must possess considerable weight to produce the necessary tractive effort in drawing a plow through the soil, and this very factor renders the tractor unfit for use in soft or muddy ground. After a field has been plowed a tractor is no longer desirable for harrowing or cultivating because the plowed ground will be pressed down and the benefits of plowing obliterated.

The object of my invention is to provide tractional means, other than the ground, (such as a cable) on which the tractive force necessary to pull a plow will be expended, the weight of the tractor no longer being a factor to consider. By providing a cable fixed at both ends, and suitable means on the tractor (which is merely a truck) for gripping the cable, the plows can be drawn over soft ground, or up a slope, without danger of the tractor becoming stalled. Practically none of the energy which drives the tractor will be lost, because I have entirely eliminated the drawback of the tractor becoming stuck in the mud.

Further objects will be better apparent from a detailed description of my invention in connection with the accompanying drawings in which—

Figure 1:
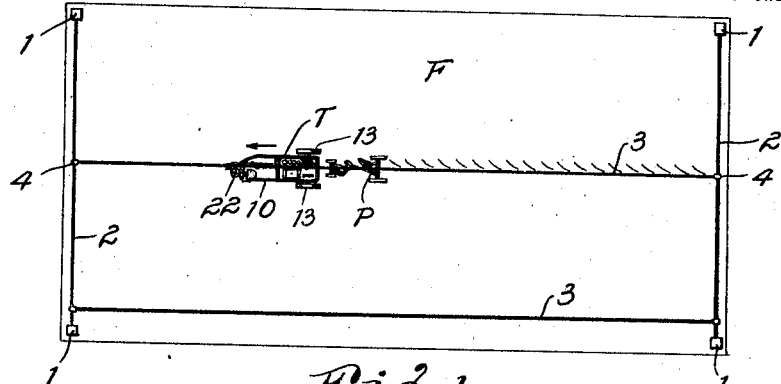
Figure 2:
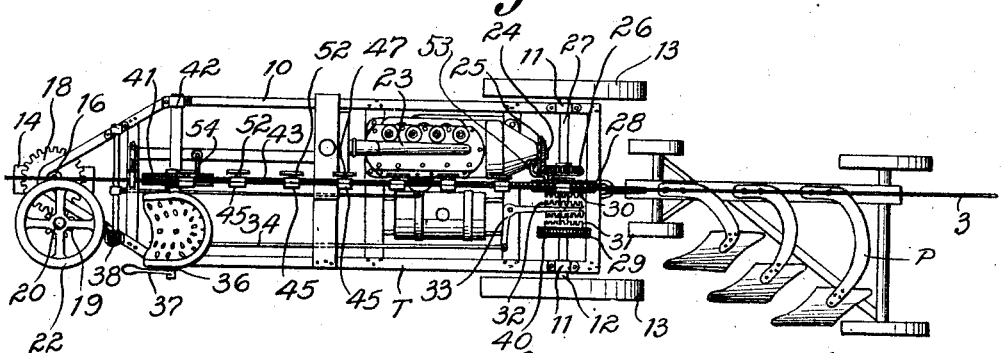
Figure 3:
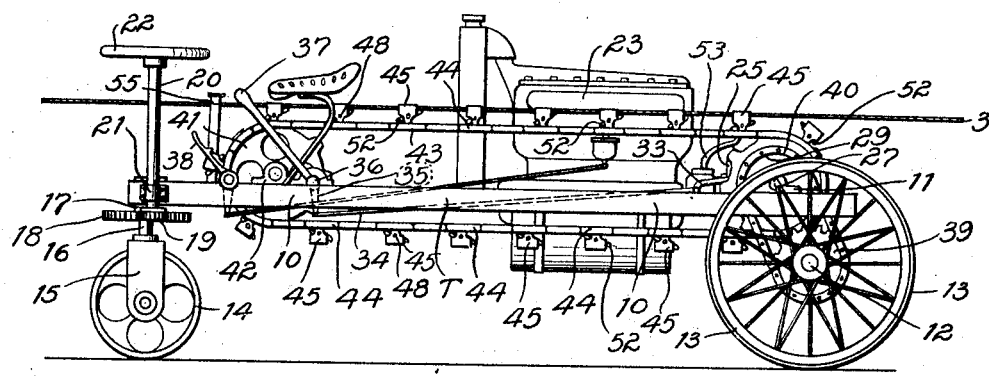

Figure 1 is a diagrammatic view of a field showing my invention in operation; Fig. 2 is a plan view of my invention with a gang plow attached thereto, the plow being shown more or less conventionally; Fig. 3 is a side elevation of the invention; Fig. 4 is a side elevation of the chain and sprockets that drive the tractor over the ground; Fig. 5 is a plan view of the chain and sprockets; Fig. 6 is an end elevation of one of the friction grips which engage the cable; Fig. 7 is a side elevation of the friction grip; Fig. 8 is a detail of the cable connection.

Referring to the drawings F represents a field that is to be worked, said field having anchor posts 1 at each corner. At the ends of the field cables 2, 2 are stretched between the posts 1, 1 and cables 3, 3 are stretched between cables 2, 2 to which they are clamped by means of a clamp 4, having a fixed jaw 5 secured to each end of the cables 3, and a movable jaw 6 hinged thereto, said jaw being adjusted to and from the jaw 5 by means of a threaded stem 7 terminating in a handle 8. The outer ends of the jaws 5 and 6 terminate in semi-circular loops 5', 6' which receive between them the cable 2. By means of these loops 5', 6' the cables 3 may be slid back and forth on the cables 2, 2 and may be readily removed by unscrewing the jaw 6 so as to release the cable 2 from between loops 5', 6'.

The cables 3 are used as the tracting medium instead of the ground and the manner of so using them will be apparent from the description of the tractor which is as follows:

T represents a tractor provided with a frame 10 supported by suitable bearings 11, 11 on the rear axle 12, having wheels 13, 13 on its extremities, and a front guide wheel 14 mounted in a bifurcated guide frame 15 rotatable on a stem 16 in a bearing 17. The stem 16 has a gear wheel 18 fixed on it which meshes with a pinion 19 on the steering staff 20 mounted in a bearing 21. The staff 20 carries a steering wheel 22 on its upper end whereby the tractor may be steered when necessary, although when the tractor is being used in the field for plowing no steering is necessary except when turning at the ends of the field. This will become better apparent from what follows.

An internal combustion engine 23 is mounted on the frame 10, and the propeller shaft 24 of the engine has a bevel gear 25 mounted on its extremity, said gear meshing with a bevel gear 26 keyed on a countershaft 27 which will be constantly driven when the engine is running. The countershaft 27 has loosely mounted on it a sprocket 28 in the center thereof, and a spocket 29 near the end opposite to the engine, said sprockets 28 and 29 being provided with clutch faces 30 and 31 respectively for engaging a clutch 32 which may be shifted into engagement with either sprocket 28 or 29 by means of a bell-crank lever 33, to one leg of which is connected a rod 34, said rod also being connected with a depending lever 35 on a rock-shaft 36 having a shift lever 37 mounted on its outer end. When the operator throws the lever 37 forward the clutch 32 (which is feathered on the shaft 27) engages clutch face 30 on sprocket 28, driving said spocket, and when the lever 37 is pulled backward the sprocket 29 is driven.

The engine is controlled by a throttle pedal 38 and such other controlling means as are well understood in the art, and, hence, not illustrated.

The sprocket 29 when engaged by the clutch 32 drives a sprocket 39 on the axle 12 through the medium of a chain 40, thus propelling the tractor as an ordinary truck.

A sprocket 41 is mounted in line with sprocket 28 on a journal 42, supported on the frame 10, and a link sprocket chain 43 passes over sprockets 28 and 41 certain of the links 44 constituting the chain having formed integral with them arms 44' having jaws 45 formed on their upper ends. Hinged to each arm 44' is an arm 46 also terminating in a jaw 47 at its free end, the jaws 45 and 47 being opposed to each other and operating as the jaws of a vise. A stem 48 is screw-threaded into the arm 44 and operates through a slotted opening 49 in jaw 47, said stem 48 having an annular shoulder 50 formed on it against which the arm 46 is forced by a spring 51 coiled about the stem 48 between arms 44 and 46. The stem 48 projects a short distance beyond the shoulder 50 and has a cross-arm 52 formed on its extremity.

It will be observed that the gripping face $a$ of each jaw follows a rather shallow arc and in addition is lined with a layer of felt or leather $b$ (or equivalent material) making the actual gripping surface $c, c$ of the jaws still more shallow so that if the cable 3 is gripped between the jaws it will require but a partial turn of the stem 48 (with a sufficiently pitched thread) to effect a release of the cable from between the jaws, or, vice versa, an engagement of the cable by the jaws. This release is brought about by a tappet 53 mounted on the frame 10 above sprocket 28 in the path of the upper part of the cross-arm 52 (Fig. 4). A tappet 54 is mounted on the frame 10 above the sprocket 41 and in the path of the lower part of cross-arm 52, which on engaging the tappet 54 will be turned substantially through an angle of ninety degrees and drawing the jaws 45 and 47 together to grip the cable 3.

The operation of my invention may be described as follows:

We will assume that the farmer wishes to plow his field F, and that he intends to plow so as to leave a ditch every forty paces. He will first adjust his cables 3, 3 forty paces apart, and then line up his tractor T so that one of the cables (for instance the middle cable) passes directly over the center of the tractor. It is necessary, in starting the operation, to grip the cable with a few sets of the jaws 45, 47 by placing the cable between the jaws and tightening them by hand. He now starts his engine and shifts the clutch 32 to engage sprocket 28, thus driving said sprocket and causing the chain 43 to travel in the direction of the arrow (Fig. 4). As each set of jaws 45, 47 come up over the sprocket 41, their cross-arms 52 will be engaged by the tappet 54 and the jaws tightened almost as soon as they receive the cable 3. As the chain 43 moves toward the rear the tractor will be propelled forwardly or pulled as it were by the rearward force exerted on the cable by the jaw sets. Of course, each set of jaws must be released from the cable as it reaches the sprocket 28 so that it will be free to travel over the sprocket and along the lower lap of the chain as it again moves to the front. This release is accomplished by the tappet 53 which engages the cross-arm 52 and turns it in the reverse direction to which it was turned by tappet 54.

An eye 55 is mounted at the front of the tractor in order to receive the cable 3 and guide the same to the jaws 45, 47. The eye has a hinged section 56 in order that it may be opened to receive the cable.

As the tractor T travels from one end of the field to the other, the gang plow P (shown conventionally) is pulled through the coil and, if a right hand plow, turns the furrow to the right. Now, when the center cable 3 has been followed from one end to the other the tractor is released from it, the clutch 32 is shifted to sprocket 29, and the tractor driven over to the other cable 3, which is followed in the opposite direction to the end of the field. The cables 3, 3 are now moved over the space of a furrow and the operation continued until the forty paces have been plowed both ways leaving a ditch in the center with furrows to the right and left of it.

If it is desired to back-furrow but one cable 3 is used, the farmer plowing back and forth along this cable moving it over each time a furrow's width.

It is obvious from the foregoing that a field can be plowed any way the farmer desires with my improved farm implement, or it may be harrowed, cultivated, rolled, etc.

Having described my invention, I claim:

1. A farm implement comprising a frame provided with a running gear, an endless chain mounted thereon, gripping devices on said chain and a tractional element disposed above said gripping devices.

2. In combination with a tractional element anchored at the ends, an automotive device having an endless chain mounted thereon, said chain being provided with gripping devices for engaging the tractional element, and means for actuating the chain to propel the automotive device.

3. A farm implement comprising a frame provided with a running gear, a pair of sprockets mounted on the frame, an endless chain adapted to pass over said sprockets, gripping devices mounted on the chain, a tractional element disposed adjacent to the chain and adapted to be engaged by the gripping devices, and means for actuating the chain to propel the farm implement.

4. In combination with a cable supported at both ends, a farm implement comprising a frame provided with a running gear, gripping devices on the frame, means for causing said gripping devices to grip the cable, means for actuating the gripping devices to propel the implement, and means for disengaging the gripping devices from the cable.

5. A system of plowing a field embracing a cable extending from one side of the field to the other, causing a farm implement to travel along said cable as a tractional element, said farm implement having gripping devices for successively engaging the cable to propel the implement over the field.

6. In combination with a farm implement, a pair of cables supported at the ends, a third cable detachably supported by said pair of cables, and means for causing the farm implement to travel along the third cable, said implement having gripping means adapted to successively engage the third cable as a tractional element whereby the implement is propelled.

7. A farm implement provided with a frame, a motor, and a running gear on said frame, a pair of sprockets mounted on the frame, a chain adapted to travel over said sprockets, gripping devices on said chain, a tractional element disposed adjacent to the chain, and means for connecting the motor to a chain sprocket whereby the gripping devices engage the tractional element to propel the implement or for connecting the motor to the running gear.

8. A farm implement provided with a frame, a motor mounted thereon, a counter-shaft on the frame adapted to be driven by the motor, said frame being supported on an axle and wheels, a sprocket loosely mounted on the counter-shaft, an endless chain mounted on said frame and adapted to be driven by said sprocket, said chain carrying gripping devices, a tractional element disposed above said gripping devices and adapted to be engaged by them, and means on said counter-shaft for connecting the motor to said sprocket or the aforesaid axle.

In testimony whereof I hereunto affix my signature.

ANTON BRUNNERT.